Nov. 23, 1965  S. M. TERRY ETAL  3,219,859
INDUCTOR ALTERNATOR HAVING AN ANNULAR STATOR CONSTRUCTION
Filed Feb. 10, 1961  3 Sheets-Sheet 1

INVENTOR.
STANLEY M. TERRY
BOB O. BURSON
BY
Teller + McCormick
ATTORNEYS

United States Patent Office 3,219,859
Patented Nov. 23, 1965

3,219,859
INDUCTOR ALTERNATOR HAVING AN ANNULAR
STATOR CONSTRUCTION
Stanley M. Terry and Bob O. Burson, Longmeadow,
Mass., assignors, by mesne assignments, to R. E. Phelon
Company, Inc., East Longmeadow, Mass., a corporation of Massachusetts
Filed Feb. 10, 1961, Ser. No. 88,538
3 Claims. (Cl. 310—155)

This invention relates to dynamo-electric machines, and deals more particularly with electric generators or alternators of the inductor type wherein the armature windings and field producing means are fixed relative to one another and changes in flux necessary to provide an E.M.F. are produced by a rotating mass of magnetic material.

A general object of this invention is to provide an electric generating device particularly adapted for use as an auxiliary power unit for an internal combustion engine, and wherein part of the device serves as a flywheel for the engine.

Another object of the invention is to provide an electric generating device of the type mentioned in the last paragraph which device is of a simple construction making maximum utilization of the available space, which produces a three-phase or other polyphase output at high efficiency, and which may be constructed with either wound field coils or with permanent magnets for establishing the required magnetic field.

Another object of this invention is to provide an electric generating device having no moving contacts, such as slip rings or commutators, and which, if desired, may be easily and economically waterproofed to protect the same against the effects of water and other deleterious atmospheres.

Another object of this invention is to provide an electrical generating device employing permanent magnets and wherein the magnet material is so arranged as to be used continuously throughout the generating cycle and wherein only two magnets are needed for any number of rotor or stator poles, thereby making more efficient use of the expensive magnet material than is the case with most other conventional permanent magnet generators where a separate magnet is provided for each rotor or stator pole and used for only part of the generating cycle.

Another object of this invention is to provide an inductor alternator having a stator adapted to be connected directly to an engine block or other stationary engine structure and a flywheel rotor adapted for connection to a shaft of the engine, thereby simplifying the construction of the alternator and reducing the number of parts required.

Other objects and advantages of the invention will be apparent from the description and claims which follow and from the drawings forming a part of this specification.

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Figure 4:
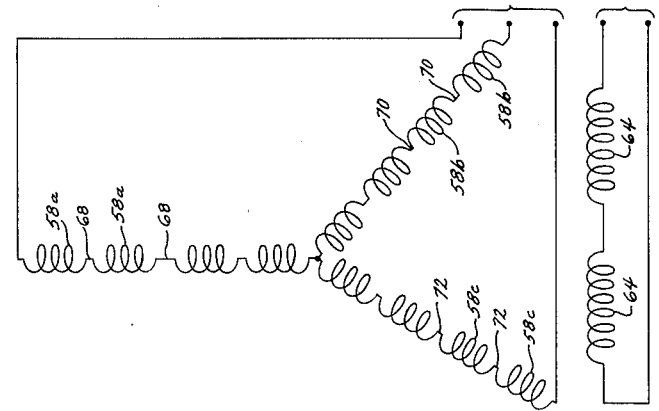

FIG. 4. is a schematic diagram illustrating the manner in which the various coils of the alternator are electrically connected.

Figure 5:
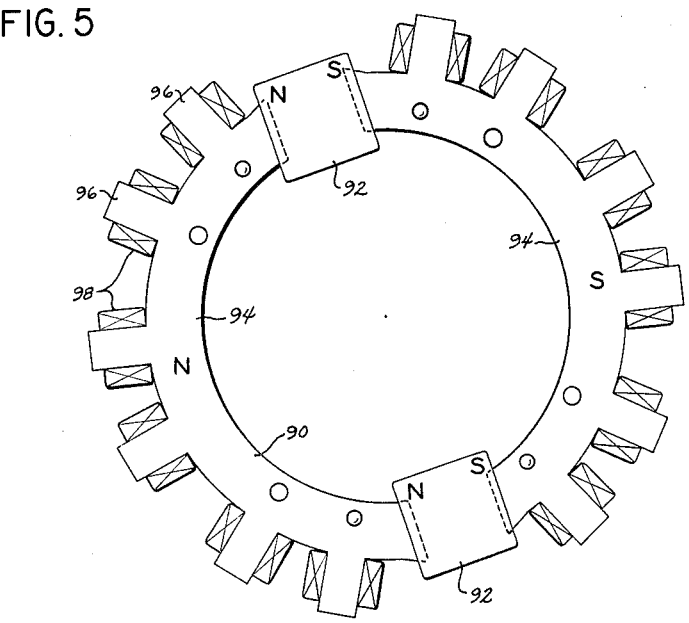

FIG. 5 is an elevational view of a modified form of stator which may be employed in the alternator of FIG .1.

Figures 1, 2:
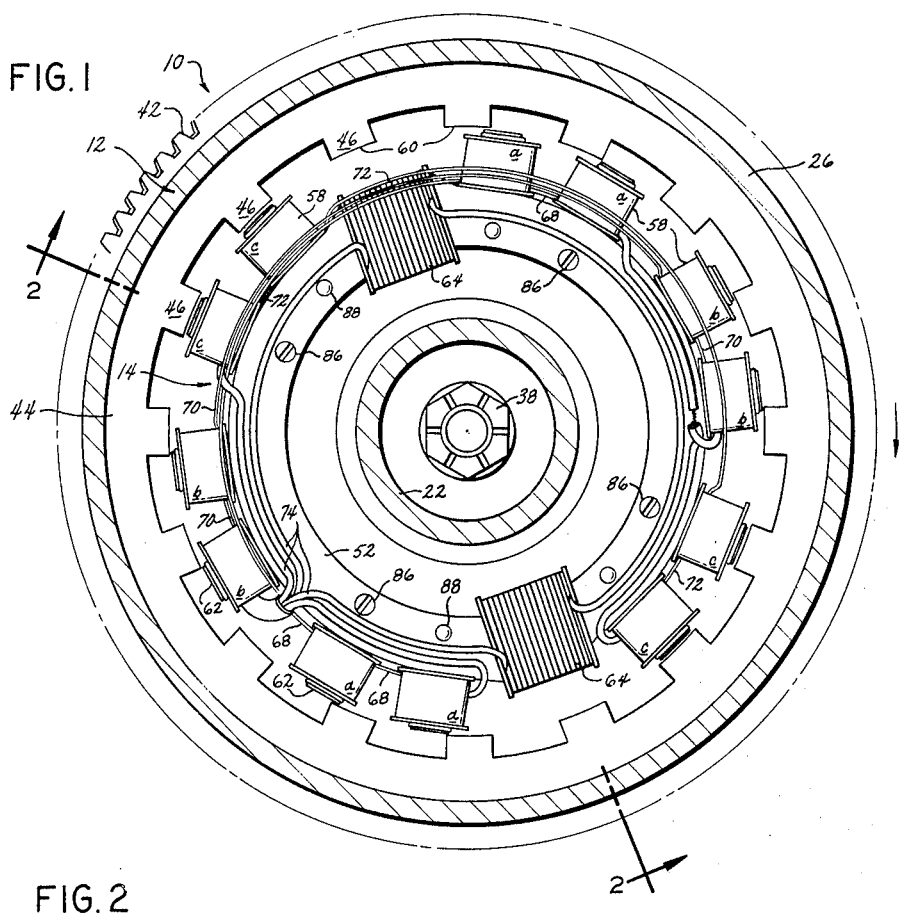
FIG. 1 is a sectional view of an alternator embodying this invention, the view being taken on a plane normal to the axis of the alternator and located close to the closed end of the rotor as indicated by the line 1–1 of FIG. 2.
FIG. 2 is a sectional view taken on the line 2–2 of FIG. 1, the view showing the alternator connected with an engine shaft and engine block or other stationary structure, which later parts serve to support respectively the rotor and stator of the alternator.
Figure 6:
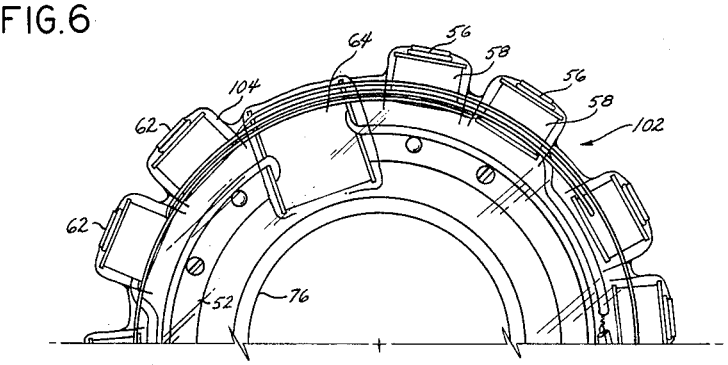

FIG. 6 is a half elevational view of another modified form of stator which may be employed in the alternator of FIG. 1.

Figure 3:
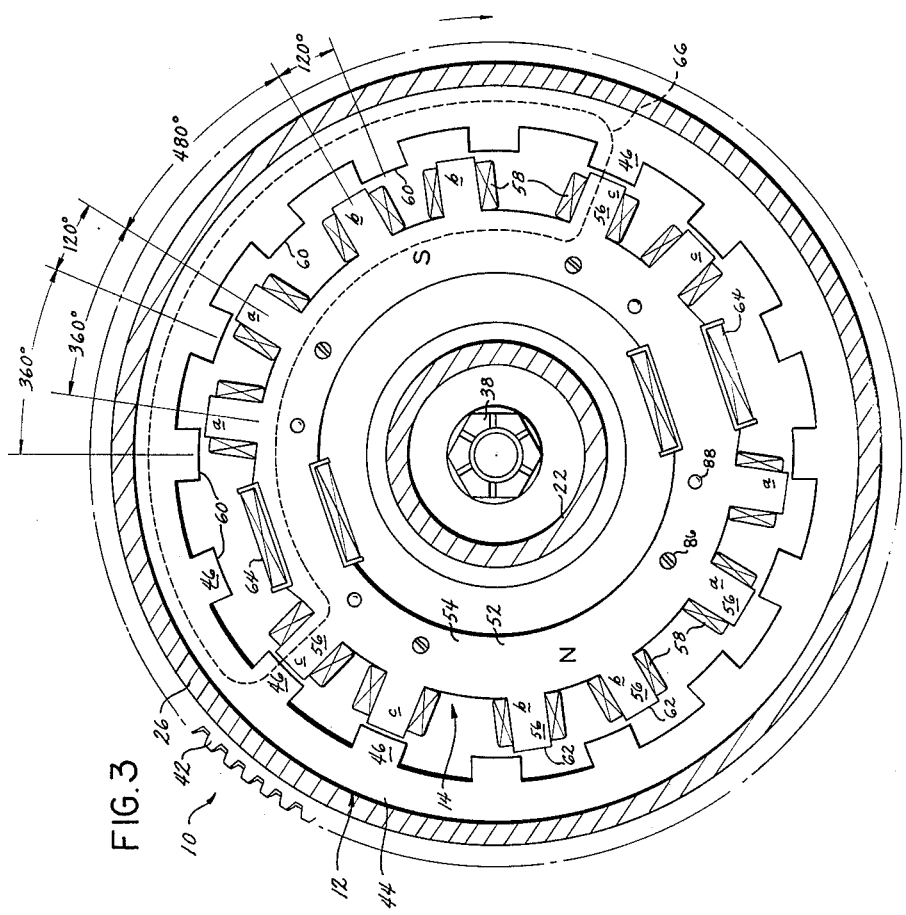
FIG. 3 is a sectional view similar to FIG. 1, but with the armature and field coils being shown schematically to show more clearly the structure of the stator annulus.

In the drawings, wherein is shown the preferred embodiments of this invention, and first referring to FIGS. 1, 2 and 3, the reference numeral 10 indicates in general a complete inductor alternator made in accordance with this invention. The alternator 10 basically comprises a rotor 12 which is in the form of a flywheel and adapted for attachment to an engine shaft or the like and a stator 14 which is adapted for attachment to the stationary structure of the engine in concentric relation to the rotor carrying shaft. As an example of how the alternator may be mounted to an engine, FIG. 2 shows the rotor 12 attached to a shaft 16 and the stator 14 attached to a stationary structure 18. The stationary structure may be part of the engine block and the shaft 16 a shaft driven from the crankshaft of the engine and supported for rotation relative to the stationary structure 18 by means of a ball bearing unit 20, as shown. Rotation of the shaft 16 accordingly causes rotation of the rotor 12 relative to the stator 14.

Associated with the stator is a magnetizing means providing a plurality of sources of magnetomotive force for establishing a magnetic field passing through the various parts of the alternator and a number of armature coils arranged to have electrical currents induced therein as a result of changes in the magnetic flux linked therewith. These changes in the magnetic flux, necessary to induce the currents in the armature coils, are in turn produced by means on the rotor which cooperate with the stator to vary the reluctance of the flux paths through the armature coils. The construction and arrangement of the cooperating rotor and stator parts and the electrical interconnection of the various armature coils is such that a three-phase or other polyphase output is provided. This output may in turn be used directly as a power source for various auxiliary equipment associated with the engine or may be rectified for battery charging purposes and the like.

As mentioned, the rotor 12 is in the form of a flywheel. Referring to FIG. 2, it will be observed that the illustrated rotor includes a generally axially extending hub 22, a radially extending web 24 and a rim 26 which extends axially of the web 24 in the same direction as the hub 22. The hub, web and rim therefore define an annular recess 28 which receives the stator 14. Preferably, and as shown, the hub, web and rim comprise a single integral unit which may be made by a casting process. The unit does not form part of the flux path and therefore is preferably made of a nonmagnetic material to minimize the leakage of flux to the shaft 16 or other engine parts.

Although various different means for attaching the rotor 12 to the shaft 16 may be employed without departing from the invention, the hub 22 of the illustrated rotor is provided with a tapered bore 30 at its left-hand end, as viewed in FIG. 2, which bore receives a correspondingly tapered portion of the shaft 16. The hub is angularly fixed to the shaft by a key 32 which fits in a key slot 34 of the hub and a corresponding slot in the shaft, as shown in FIG. 2. To the right of the tapered bore 30 the hub 22 is provided with an enlarged bore 36 which receives the threaded end of the shaft 16 and a nut 38 and washer 40 for axially fixing the rotor to the shaft, as shown. Also, as shown in FIGS. 1, 2 and 3, the rim 26 of the rotor has fixed thereto, as by press fitting, an annular gear 42 which surrounds the rotor and serves, for example, to mesh with the pinion of a starter motor or other device. The gear 42, however, is not essential to this invention and may be omitted if desired.

At this point, it should also be noted that the rotor 12, due to the arrangement of its parts, has a relatively high moment of inertia about the axis of the shaft 16 so that apart from its flux-varying function in connection with the stator 14 it will also have a flywheel effect on the shaft 16 and may therefore be used to replace the flywheel conventionally used with the engine. It will also be noted that the construction of the rotor and stator is such that they both occupy a relatively small amount of space. In fact their size is such that they take up little more, if any, space than taken up by a conventional flywheel.

For the purpose of producing a variation in the reluctance of the flux paths linking the armature coils of the stator, the rotor rim 26 has connected therewith an annulus 44 comprised of a plurality of laminations of magnetic material. The laminated construction, while preferred, is not however essential to the invention and the annulus could be made as a solid unit. The annulus is angularly fixed to the rim 26, as by press fitting, and includes a plurality of angularly spaced poles or teeth 46, 46 arranged in circular alignment and extending radially inwardly from the body thereof. To receive the annulus 44, the inner surface of the rim 26 is machined to provide a cylindrical surface 48 which terminates inwardly of the rim in a shoulder 50. In assembling the annulus with the rim, the annulus is pressed into the rim until the inner or right-hand face of the annulus engages the shoulder 50, as shown in FIG. 2.

The structure of the stator 14 is best shown in FIGS. 2 and 3. Referring to these figures, it will be observed that the stator comprises a one-piece annulus 52 having an inner annular core portion 54 and a plurality of circumaxially spaced teeth 56, 56 extending radially outwardly from the core portion. The annulus 52 is a flux-carrying member and therefore is made from a magnetic material and, preferably, is of a laminated construction, as shown in FIG. 2. The laminated construction, however, is not entirely necessary to the invention, and the annulus could be of a solid construction if desired, although this would increase the hysteresis and eddy-current losses. Also, the annulus need not necessarily be of a one-piece construction, but could also be comprised of two or more arcuate portions held together by suitable means to form a complete annulus. The annulus 52 surrounds and is radially spaced from the hub 22 of the rotor 12 and is arranged concentrically with the common axis of the rotor and the shaft 16.

The number of teeth 56, 56 on the annulus 52 may be varied, but is dependent in part on the desired number of phases in the output voltage or current. As brought out in more detail hereinbelow, the annulus has associated therewith suitable magnetizing means or sources of magnetomotive force which are arranged in such a manner as to provide two oppositely magnetically charged circumferential portions or poles; that is, to provide one north charged annulus portion or pole and one south charged annulus portion or pole. The number of teeth in turn is such that there is at least one tooth or an integral number of teeth per phase per pole. In the illustrated case, for example, the alternator is designed for a three-phase output and two teeth are provided for each phase per pole for a total of twelve teeth for the entire annulus. The annulus, however, could be designed to have only one tooth per pole per phase for a total of six teeth in the case of a three-phase output, or could be designed to have three or more teeth per phase per pole, without departing from the invention. Also, as pointed out below, the stator annulus could be designed to have more than two oppositely charged portions or poles without departing from the broader aspects of the invention.

Included in the stator 14 are a plurality of armature coils 58, 58, each of which is received by and surrounds a respective one of the teeth 56, 56. The armature coils are therefore adapted to have voltages or E.M.F.'s induced therein as the result of changes in the flux passing through the associated teeth. As mentioned previously, the flux passing through the stator teeth is varied by the action of the moving rotor poles 46, 46. From FIGS. 1 and 3 it will be observed that the rotor poles are equally angularly spaced and have their inner end faces 60, 60 arranged along a common circle so as to pass in close radially spaced relationship to the outer end faces 62, 62 of the stator teeth 56, 56, which end faces are also arranged along a common circle, when the rotor is rotated. When a rotor pole is fully angularly aligned with a stator tooth, the reluctance of the flux path through that tooth will be at a minimum value and the flux at a maximum. Likewise, when the same tooth is positioned midway between two rotor poles the reluctance of the flux path through the tooth will be at a maximum value and the flux at a minimum. Obviously, therefore, the rotation of the rotor will bring the stator tooth alternately in to and out of full alignment with successive rotor poles and the flux therethrough will vary periodically or cyclically with a constant period or time interval for each cycle due to the equal spacing of the poles 46, 46. Preferably, as shown, the rotor pole end faces 60, 60 have a slightly larger circumferential length than the stator tooth end faces as this generally results in a more nearly sinusoidal flux variation in the tooth and therefore a more nearly sinusoidal voltage variation in the armature coil, as is usually desired. However, the end faces 60, 60 could be made the same length as the end faces 62, 62 or of another relative size different from that shown without departing from the invention.

As mentioned previously, the sources of magnetomotive force used to establish the necessary flux in the illustrated alternator are so arranged that the stator annulus is provided with two circumferential portions or poles of opposite magnetic polarity. In the alternator of FIGS. 1 to 4 these sources comprise two spool-like field coils 64, 64 which are wound around the core portion 54 of the annulus at diametrically opposite locations. The two field coils 64, 64 are adapted to be excited by a D.C. input and are so wound that when excited the magnetic field produced in the annulus by one coil opposes the field produced by the other coil. For example, in FIG. 3, if the upper coil 64 when excited has a north polarity at its right-hand end, the lower coil 64 is likewise arranged to have a north polarity at its right-hand end and a south polarity at its left-hand end. Therefore, the generally semicircular portion of the annulus 52 located to the left of the line drawn between the two coils 64, 64 will constitute a north polarity pole, as indicated by the letter N in FIG. 3, and the semicircular portion to the right of the same line will constitute a south polarity pole, as indicated by the letter S. The teeth 56, 56 on the N portion of the annulus will accordingly be of north polarity, and the teeth 56, 56 on the S portion will accordingly be of south polarity. Magnetic flux will therefore flow from the north polarity teeth to the south polarity teeth by passing through the rotor annulus 44. The path traveled by one line of flux is for instance shown by the dashed line 66 in FIG. 3. From this it will be observed that the flux passes from a north polarity stator tooth 56 to a rotor pole 46 by crossing the air gap therebetween, and then travels circumferentially through the body of the rotor annulus to another rotor pole from which it passes to a south polarity stator tooth by crossing the air gap therebetween. Of course, as mentioned previously, the amount of flux passing through any one stator tooth will depend on its degree of alignment with a corresponding rotor pole and will vary periodically due to the rotation of the rotor.

The teeth 56, 56 may be arranged on the stator annulus according to various different schemes, but in order to provide for a polyphase output are preferably arranged in groups and in such a manner that the teeth comprising any one group will all be at the same degree of alignment with corresponding rotor poles for any position of the rotor, and are further arranged in such a manner that the teeth of one group at any instant will be at a different degree of alignment with corresponding rotor poles than the degree of alignment between the teeth of the other groups and the same or other rotor poles. Thus, the currents and voltages generated in the armature coils of one group of stator teeth will be out of phase with the currents and voltages generated in the armature coils of the other groups of stator teeth. For example, in the illustrated case the alternator 10 is designed for a three-phase output and the stator teeth are accordingly divided into three phase groups. The relationship of the stator teeth with the rotor poles is such that when the teeth comprising one of said groups are brought into full angular alignment with corresponding rotor poles the teeth comprising one of the other two groups will be spaced by +120 electrical degrees from full alignment with the same or other rotor poles and the teeth comprising the other group will be spaced by −120 electrical degrees from full alignment with the same or other rotor poles. As a result, the currents and voltages induced in the coils of one group will be out of phase by plus and minus 120 electrical degrees respectively with the currents and voltages induced in the coils of the other two groups.

Although various different arrangements of the stator teeth may be employed to produce such a phase relationship between the three groups of stator teeth and coils, the preferred arrangement is shown in FIG. 3. In this figure the teeth comprising one group are indicated by the letter $a$ applied to the individual teeth, and the teeth comprising the other two groups are indicated respectively by the letters $b$ and $c$ applied to the individual teeth. The arrangement of the teeth on the south polarity pole of the stator annulus is similar to the arrangement of teeth on the north polarity pole. Considering the south polarity pole, it will be noted that the teeth of each phase group are grouped together so that the three phase groups are located along different circumferential lengths of the pole. In the present case each phase group includes two teeth, although as mentioned previously, there could be more or less teeth in each group. Assuming the angular spacing between adjacent rotor poles 46, 46 to be equal to 360 electrical degrees, as shown in FIG. 3, the spacing between the teeth of a phase group, when the group includes more than one tooth, is also equal to 360 electrical degrees, as shown. Therefore, all of the teeth of the group will have the same degree of overlap or alignment with corresponding rotor poles. Likewise, the spacing between the last tooth of one phase group and the first tooth of the next phase group is equal to 480 electrical degrees. Thus, as shown in FIG. 3, when the two teeth of group $c$ are fully aligned with corresponding rotor poles, the teeth of group $a$ will be displaced 120 electrical degrees in one direction from full alignment with other rotor poles and the teeth of group $b$ will be displaced by 120 electrical degrees in the other direction from full alignment with still other rotor poles. Assuming that the rotor is rotated clockwise, as shown by the arrow in FIG. 3, the teeth of group $a$ will be approaching alignment with rotor poles and the teeth of group $b$ will be departing from alignment with rotor poles at the instant pictured in FIG. 3.

With conditions as shown in FIGS. 1 and 3, the reluctance of the flux paths through the individual stator poles comprising the group $c$ will be at a minimum value, the reluctance of the flux paths through the stator poles comprising the group $a$ will be decreasing, and the reluctance of the flux paths through the poles comprising the group $b$ will be increasing. Consequently, the flux passing through each pole of group $c$ will be at its maximum value, the flux passing through the poles and coils of group $a$ will be increasing, and the flux passing through the poles and coils of group $b$ will be decreasing. Assuming that the rotation of the rotor causes the flux in each stator pole to vary sinusoidally, as is approximately the case, the voltages induced in the armature coils will also vary sinusoidally with the voltage induced in each coil being 90 degrees out of phase and leading the associated flux. Furthermore, the phase relationships between the voltages generated in the three groups of coils is such that the voltage produced by the coils of group $a$ will lag by 120 degrees the voltage produced in the coils of group $c$ and the voltage produced in the coils of group $b$ will lead by 120 degrees the voltage produced by the coils of group $c$.

As shown in FIG. 1, the coils comprising each of the three groups on both poles of the stator are preferably electrically interconnected in series, the coils of group $a$ being interconnected by leads 68, 68, the coils of group $b$ being interconnected by leads 70, 70 and the coils of group $c$ being interconnected by leads 72, 72. FIG. 4 shows schematically the electrical interconnection of the coils from which it will be noted that the three groups of series connected coils are connected in the familiar three-phase Y arrangement. Instead of the Y connection, the three groups of series connected coils could also, if desired, be connected in Δ fashion. The three-phase output is taken from the alternator, and the D.C. field excitation supplied, through the leads indicated at 74, 74 in FIGS. 1 and 2. It should also be apparent that the output voltage will be dependent on the strength of the flux field produced by the field coils 64, 64 and that therefore the output voltage may be readily varied by varying the voltage supplied to the field coils. It should also be noted that the flux passing through the teeth on the south polarity pole of the annulus travels in a direction opposite to the flux passing through the teeth on the north polarity pole of the annulus. Therefore, the armature coils on one pole should be wound in the opposite direction or interconnected in reverse fashion to those on the other pole so that when the coils of the corresponding phase groups are interconnected in series their voltages will add.

At this point is should be further noted that although the alternator 10 is shown to have a two-pole stator including two field coils the invention is not necessarily limited to a two-pole construction, and an alternator employing the same principles as herein disclosed could be constructed with any even number of magnetic poles by adding other sets of field coils. For example, a four-pole alternator could be constructed by winding on the stator annulus four field coils spaced apart by 90 degrees and arranged in such a manner that when excited the adjacent ends of adjacent coils are of the same magnetic polarity with the result that alternate quadrants of the annulus are of opposite magnetic polarity. Each quadrant of the annulus in this event should also, of course, be provided with one or more teeth for each desired output phase and the teeth should be appropriately spaced to provide the proper electrical phase displacement between the different teeth or groups of teeth on each quadrant.

The stator annulus 52 may be supported from the stationary engine structure 18, or equivalent supporting structure, by various suitable means. In the illustrated and preferred case this means includes, as shown in FIG. 2, an annular mounting ring 76. The mounting ring 76 surrounds the rotor carrying shaft 16 and part of the rotor hub 22. At its left-hand end, as viewed in FIG. 2, the ring is machined to provide a circular rib 78 which fits within a corresponding circular recess in the stationary structure 18 to locate the ring concentrically with the shaft 16. Adjacent to the rib 78 the ring is provided with a radially outwardly extending flange 80 which is slotted at two or more locations to receive fasteners, such as bolts 82, 82, for securing the ring to the structure 18. At its right-hand end the ring 76 is also machined to provide another circular rib 84 which extends through a portion of the stator annulus to locate the latter member concentrically with the ring. At the locations of the field coils 64, 64 the ring may be further relieved, as indicated at 86 in FIG. 2, to accommodate the coils. The stator annulus is in turn held to the mounting ring by a plurality of fasteners 86, 86 which extend through the annulus and are threadably received by the mounting ring. The laminations of the stator annulus may also be held together as a unit, if desired, by a number of rivets 88, 88 as shown in FIG. 1. The mounting ring 76 does not constitute a part of the flux circuit for the alternator and therefore is preferably made of a non-magnetic material such as aluminum to prevent the leakge of flux to the stationary structure 18 or other engine parts.

One of the features of this invention is that the basic alternator design may be easily modified to provide for excitation either by field coils or by permanent magnets. Having described above in connection with FIGS. 1 to 4 an alternator having fields coils, reference is now made to FIG. 5 which shows a stator annulus 90 having permanent magnets 92, 92 in place of the field coils. Except for the substitution of the magnets for the field coils, the annulus 90 is generally similar to the annulus 52 of FIGS. 1, 2 and 3, and may be used to replace the latter annulus in the alternator 10. The annulus 90 preferably includes two separate and generally semicircular portions 94, 94 having their ends received in recesses formed in the end faces of the magnets 92, 92. That is, the two magnets 92, 92 are respectively disposed between the two pairs of adjacent ends of the two separate semicircular portions 94, 94 so as to form a part of the complete annulus 90 and to be located diametrically opposite from each other. The portions 94, 94 are preferably of laminated construction and include teeth 96, 96, the latter teeth being shaped and arranged similar to the teeth 56, 56 of the annulus 52 and being surrounded by armature coils 98, 98 similar to the coils 58, 58 of the annulus 52. Similar to the field coils 64, 64, the permanent magnets are arranged so that the adjacent or opposing end faces thereof are of similar magnetic polarities with the result that the two semicircular portions 94, 94 will be of opposite magnetic polarities, as indicated by the letters S and N in FIG. 5.

Referring to FIG. 5 it wil be observed that the particular arrangement of magnets employed makes efficient use of the magnet material in that the two magnets are effective to polarize all of the teeth 96, 96 and are active at all times to provide useful flux. Considering FIG. 5 in conjunction with FIG. 3, for example, it should be obvious that the total flux passing from one pole or semicircular portion 94 and into the other pole or semicircular portion is substantially constant. Therefore the flux passing through each magnet will remain substantially constant. This should be contrasted with the usual prior art permanent magnet generators where it is customary to employ many magnets, often one for each stator or rotor tooth or pole, and where the magnets are often effective to provide useful flux during only part of the generating cycle due to high reluctance flux paths through the magnets during other parts of the generating cycle.

Also similarly to the case of a wound field annulus, an annulus employing permanent magnets is not necessarily limited to the two permanent magnets shown in FIG. 5. Instead, any even number of magnets could be employed and arranged so that alternate circumferential portions of the annulus would be of opposite magnetic polarities.

One of the features of this invention is that the above described structures of the alternator may be readily and economically waterproofed to protect the same from water and other atmospheres. FIG. 6 shows a waterproofed stator 102 which may be employed in the alternator 10 in place of the stator 14 shown in FIGS. 1, 2 and 3. The stator 102 is identical with the stator 14 described above except for the addition of a potting or waterproofing material which surrounds the field coils 64, 64, the armature coils and at least part of the other structure of the stator so as to completely seal the field and armature coils from the surrounding atmosphere. In FIG. 6 the potting material is indicated at 104. This material is preferably an epoxy or other suitable material conventionally used for potting purposes. The material may be applied to the stator by the use of a mold, in which case the potting material is cast around the various parts of the stator, or may be applied by dipping the stator into a quantity of the material. After the casting or dipping process, any material which adheres to the end faces 62, 62 of the teeth 56, 56 should be removed to avoid interference with the rotor poles 46, 46. Since the alternator contains no moving contacts, the plotting material surrounds all of the current carrying elements and provides a more effective degree of waterproofing than is generally obtainable with other electrical generating devices. The rotor 12 might also be provided with a coat of potting material to prevent rust; however, since the rotor contains no current carrying elements, this is not necessary for the complete and effective waterproofing of the device. Also, although the stator 102 is shown to be similar to the stator 14 of FIG. 1, and therefore includes field coils 64, 64, it will be obvious that a stator employing permanent magnets could be waterproofed in a similar manner.

The invention claimed is:

1. In an inductor alternator, the combination comprising an annular stator surrounding a central axis, said stator including two generally semicircular portions of magnetic material arranged generally end to end to form an annulus and two magnetizing means disposed at diametrically opposite locations adjacent the ends of said generally semicircular portions, a plurality of teeth on each of said generally semicircular portions, each of said teeth having a principal axis positioned radially with respect to said central axis and having only a single face on its free end arranged perpendicular to said principal axis, said end faces of said stator teeth collectively defining an annular series of such faces surrounding said central axis, a plurality of armature coils each of which is received by and surrounds a single one of said teeth, and a rotor supported for rotation about said central axis and including an annular series of teeth defining an evenly spaced annular series of end faces which move in closely spaced relationship to said annular series of stator end faces as said rotor is rotated, the number of teeth on each of said generally semicircular stator portions being a multiple of three and each set of three teeth on each generally semicircular portion being arranged so that the voltage induced in the associated armature coils are 120 electrical degrees out of phase with one another.

2. The combination as defined in claim 1 further characterized by said two generally semicircular stator portions being part of a continuous member, and said magnetizing means each comprising a field coil wound around said stator member with its axis generally perpendicular to a radial line drawn from said central axis.

3. The combination as defined in claim 1 further characterized by said two generally semicircular stator portions being separate members, and said magnetizing means each comprising a permanent magnet disposed between a pair of ends of said two separate semicircular portions so that said two semicircular portions and said two magnets comprise a complete annulus.

References Cited by the Examiner

UNITED STATES PATENTS

| | | | |
|---|---|---|---|
| 559,419 | 5/1896 | Steinmetz | 310—168 |
| 661,292 | 11/1900 | Kelly | 310—168 |
| 661,306 | 11/1900 | Chesney | 310—168 |
| 1,301.077 | 4/1919 | Pennington | 310—168 |
| 1,476,733 | 12/1923 | Smith | 310—168 |
| 1,687,233 | 10/1928 | Stoller | 310—169 |
| 1,998,409 | 4/1935 | Klaiber | 310—155 |
| 2,071,953 | 2/1937 | Schou | 310—168 |
| 2,254,919 | 9/1941 | Smith | 310—168 |
| 2,456,475 | 12/1948 | Wargin et al. | 310—155 X |
| 2,505,130 | 4/1950 | Maynard | 310—155 |
| 2,618,757 | 11/1952 | Weisman | 310—45 X |
| 2,702,867 | 2/1955 | Wightman | 310—168 |
| 2,814,745 | 11/1957 | Sinclair | 310—168 X |
| 2,816,240 | 12/1957 | Zimmerman | 310—168 X |
| 2,827,582 | 3/1958 | Krebs | 310—168 |
| 2,993,134 | 7/1961 | Harvey | 310—218 |
| 3,041,486 | 6/1962 | Moffitt | 310—168 |

FOREIGN PATENTS

| | | |
|---|---|---|
| 690,712 | 4/1953 | Great Britain. |

ORIS L. RADER, *Primary Examiner.*

MILTON O. HIRSHFIELD, *Examiner.*